United States Patent
Liu et al.

(10) Patent No.: US 10,674,090 B2
(45) Date of Patent: Jun. 2, 2020

(54) METHOD AND DEVICE FOR CONTROLLING PHOTOGRAPHY OF UNMANNED AERIALVEHICLE, ANDWEARABLE DEVICE

(71) Applicant: GOERTEK INC., Shandong (CN)

(72) Inventors: Cui Liu, Weifang (CN); Xiangdong Zhang, Weifang (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 16/329,136

(22) PCT Filed: Jul. 21, 2017

(86) PCT No.: PCT/CN2017/093802
§ 371 (c)(1),
(2) Date: Feb. 27, 2019

(87) PCT Pub. No.: WO2018/040785
PCT Pub. Date: Mar. 8, 2018

(65) Prior Publication Data
US 2019/0208129 A1    Jul. 4, 2019

(30) Foreign Application Priority Data
Aug. 31, 2016  (CN) .......................... 2016 1 0784049

(51) Int. Cl.
*H04N 5/232* (2006.01)
*G05D 1/00* (2006.01)
(Continued)

(52) U.S. Cl.
CPC ....... *H04N 5/23299* (2018.08); *B64C 39/024* (2013.01); *B64D 47/08* (2013.01);
(Continued)

(58) Field of Classification Search
CPC ............... H04N 5/23203; H04N 5/232; H04N 5/23299; H04N 5/23296; B64C 2201/127;
(Continued)

(56) References Cited

U.S. PATENT DOCUMENTS

2008/0071431 A1* 3/2008 Dockter .................. B63B 35/50
701/3
2014/0046589 A1* 2/2014 Metzler ................ G01C 15/004
701/514
(Continued)

FOREIGN PATENT DOCUMENTS

CN   101231336 A   7/2008
CN   103824340 A   5/2014
(Continued)

OTHER PUBLICATIONS

ISA/CN, International Search Report and Written Opinion (with English translation), dated Sep. 22, 2017, re PCT International Patent Application No. PCT/CN2017/093802.
(Continued)

*Primary Examiner* — Christopher S Kelley
*Assistant Examiner* — Kathleen M Walsh
(74) *Attorney, Agent, or Firm* — Perry + Currier Inc.

(57) ABSTRACT

A method and apparatus for controlling photography of an unmanned aerial vehicle and a wearable device are disclosed. The method includes: acquiring position information of a target on the ground and a user, and calculating relative position between the target and the user by using the acquired position information to obtain relative position information between the target and the user; according to the relative position information, obtaining predetermined photographing position information matching the relative position information and corresponding to the user, and generating a movement control instruction, wherein the
(Continued)

predetermined photographing position information comprises: straight line distance information between the unmanned aerial vehicle and the target, angle information between the unmanned aerial vehicle and the target, and height information between the unmanned aerial vehicle and the ground; and sending the movement control instruction to the unmanned aerial vehicle, and controlling the unmanned aerial vehicle to move and perform photography.

20 Claims, 3 Drawing Sheets

(51) Int. Cl.
  B64C 39/02 (2006.01)
  B64D 47/08 (2006.01)
(52) U.S. Cl.
  CPC ......... *G05D 1/0011* (2013.01); *G05D 1/0094* (2013.01); *H04N 5/232* (2013.01); *H04N 5/23203* (2013.01); *B64C 2201/127* (2013.01); *B64C 2201/146* (2013.01)
(58) Field of Classification Search
  CPC ............ B64C 2201/146; B64C 39/024; B64C 2201/00; B64C 2201/123; B64D 47/08; G05D 1/0011; G05D 1/0094; H04B 7/18504
  USPC ....................................................... 348/144
  See application file for complete search history.

(56) References Cited

U.S. PATENT DOCUMENTS

| | | | | |
|---|---|---|---|---|
| 2014/0163775 A1* | 6/2014 | Metzler | ................ | G01C 15/002 701/2 |
| 2014/0210663 A1* | 7/2014 | Metzler | ................. | G01C 15/00 342/357.34 |
| 2016/0078759 A1 | 3/2016 | Nerayoff et al. | | |
| 2017/0123413 A1* | 5/2017 | Ye | ......................... | G08G 5/0013 |
| 2017/0174344 A1* | 6/2017 | Lema | .................... | B64C 39/024 |
| 2017/0240277 A1* | 8/2017 | Molnar | ................ | B64C 39/022 |
| 2017/0277180 A1* | 9/2017 | Baer | .................... | G05D 1/0038 |
| 2017/0322017 A1* | 11/2017 | Aoki | ...................... | G01B 11/00 |
| 2017/0371353 A1* | 12/2017 | Millinger, III | ........ | G01S 5/0263 |
| 2018/0109767 A1* | 4/2018 | Li | ..................... | H04N 5/23206 |
| 2018/0288304 A1 | 10/2018 | Li et al. | | |
| 2018/0292214 A1* | 10/2018 | Zhang | ..................... | G05D 1/101 |
| 2018/0362185 A1* | 12/2018 | Qian | ..................... | B64C 39/024 |
| 2019/0019141 A1* | 1/2019 | Torii | .................. | G06Q 10/0832 |
| 2019/0072392 A1* | 3/2019 | Haspel | .................... | G01C 21/00 |
| 2019/0220002 A1* | 7/2019 | Huang | .................... | G06T 7/593 |

FOREIGN PATENT DOCUMENTS

| | | | | |
|---|---|---|---|---|
| CN | 104571132 A | | 4/2015 | |
| CN | 104853104 A | | 8/2015 | |
| CN | 104917966 A | | 9/2015 | |
| CN | 105320242 A | | 2/2016 | |
| CN | 105391939 A | | 3/2016 | |
| CN | 205103661 U | | 3/2016 | |
| CN | 105512643 A | | 4/2016 | |
| CN | 105676865 A | | 6/2016 | |
| CN | 105759839 A | | 7/2016 | |
| CN | 105857582 A | * | 8/2016 | .............. G06T 7/20 |
| CN | 106454069 A | | 2/2017 | |

OTHER PUBLICATIONS

SIPO, First Office Action, dated Mar. 18, 2019, re Chinese Patent Application No. 201610784049.X.
SIPO, Notification to Grant Patent Right for Invention [with English translation], dated Aug. 22, 2019, re Chinese Patent Application No. 201610784049.X.

* cited by examiner

METHOD AND DEVICE FOR CONTROLLING PHOTOGRAPHY OF UNMANNED AERIAL VEHICLE, AND WEARABLE DEVICE

CROSS REFERENCE TO RELATED APPLICATIONS

This application is a U.S. National Stage entry under 35 U.S.C. § 371 based on International Application No. PCT/CN2017/093802, filed on Jul. 21, 2017, which was published under PCT Article 21(2) and which claims priority to Chinese Patent Application No. 201610784049.X, filed on Aug. 31, 2016. The embodiment of the priority applications are hereby incorporated herein in their entirety by reference.

TECHNICAL FIELD

The present disclosure relates to the technical field of unmanned aerial vehicle control, and in particular to a method and apparatus for controlling photography of an unmanned aerial vehicle and a wearable device.

BACKGROUND

In the prior art, the unmanned aerial vehicle is often used in photography or video recording, but during the process of photography or video recording, the position of the person often changes. In order to photograph a better image, the user needs to remotely control the position and angle of the unmanned aerial vehicle in real time, so that the camera on the unmanned aerial vehicle is aimed at the human face as accurately as possible. Thus, every time the user moves, the unmanned aerial vehicle may have to be remotely controlled to re-adjust the photographing position and angle of the unmanned aerial vehicle, and the user experience is poor.

SUMMARY

The present disclosure provides a method and apparatus for controlling photography of an unmanned aerial vehicle and a wearable device, so as to solve the problems in the prior art that when photography by using an unmanned aerial vehicle, the user must frequently operate to control the photography of the unmanned aerial vehicle and the user experience is poor.

According to an aspect of the present disclosure, a method for controlling photography of an unmanned aerial vehicle is provided, and the method comprises:

acquiring position information of a target on the ground and a user, and calculating relative position between the target and the user by using the acquired position information to obtain relative position information between the target and the user;

according to the relative position information, obtaining predetermined photographing position information matching the relative position information and corresponding to the user, and generating a movement control instruction, wherein the predetermined photographing position information comprises: information of straight line distance between the unmanned aerial vehicle and the target, angle information between the unmanned aerial vehicle and the target, and height information between the unmanned aerial vehicle and the ground; and sending the movement control instruction to the unmanned aerial vehicle, and controlling the unmanned aerial vehicle to move and perform photography.

According to another aspect of the present disclosure, an apparatus for controlling photography of an unmanned aerial vehicle is provided, and the apparatus comprises:

a relative position calculating module, for acquiring position information of a target on the ground and a user, and calculating relative position between the target and the user by using the acquired position information to obtain relative position information between the target and the user;

a photographing position determining module, for according to the relative position information, obtaining predetermined photographing position information matching the relative position information and corresponding to the user, and generating a movement control instruction, wherein the predetermined photographing position information comprises: straight line distance information between the unmanned aerial vehicle and the target, angle information between the unmanned aerial vehicle and the target, and height information between the unmanned aerial vehicle and the ground; and a photography controlling module, for sending the movement control instruction to the unmanned aerial vehicle, and controlling the unmanned aerial vehicle to move and perform photography.

According to still another aspect of the present disclosure, a wearable device is further provided, and the wearable device comprises:

a GPS locating unit for sending position information of the wearable device to a cloud server in real time;

a communication unit for receiving predetermined photographing position information sent by the cloud server, and sending the predetermined photographing position information to a user interaction unit, wherein the predetermined photographing position information is obtained by using the method for controlling photography of an unmanned aerial vehicle of the above aspect of the present disclosure; and a user interaction unit for outputting the predetermined photographing position information to the user, receiving confirmation information that is inputted by the user for confirming photography by using the predetermined photographing position, or receiving position modification information that is inputted by the user for modifying the predetermined photographing position, sending the confirmation information or the position modification information to the communication unit and in turn sending to the cloud server by the communication unit.

The advantageous effects of the present disclosure are as follows. In the method and apparatus for controlling photography of an unmanned aerial vehicle according to the present disclosure, the relative position between the target and the user is calculated by acquiring the position information of the target on the ground and the user individually, and by using the relative position as a reference, the predetermined photographing position information of the unmanned aerial vehicle corresponding to the relative position information can be obtained automatically, and then the unmanned aerial vehicle is controlled to move to a predetermined photographing position and perform photography. Since the unmanned aerial vehicle can be automatically controlled to adjust position and perform photography, the quantity and frequency of operations on the unmanned aerial vehicle by the user are reduced, the interaction between the user and the unmanned aerial vehicle to adjust the photography of the unmanned aerial vehicle can even be avoided, so the user experience is improved.

Moreover, the photographing position of the unmanned aerial vehicle is determined according to the relative position between the target and the user, rather than based on the position relation between the user and the unmanned aerial vehicle singly. Since there is a common reference (the target on the ground), it is more accurate and more advantageous to determine the position of the third point (the unmanned aerial vehicle) by the positions of the two points (the user and the target) than to determine the position of the second point (the unmanned aerial vehicle) by the position of one point (the user), and it is ensured that the unmanned aerial vehicle can photograph a better image.

DETAILED DESCRIPTION

The inventive concept of the present disclosure is as follows. With respect to the problems in the prior art that when photography by using an unmanned aerial vehicle, as the user moves, the user must frequently control the unmanned aerial vehicle to adjust the position and angle and thus the user experience is poor, the present disclosure proposes to determine the predetermined photographing position of the unmanned aerial vehicle according to the relative position between the target on the ground and the user, and then control the unmanned aerial vehicle to move and perform photography according to the determined predetermined photographing position. Thus, since the unmanned aerial vehicle can be automatically controlled to adjust position and perform photography, the user's control over the unmanned aerial vehicle can be avoided or reduced, and the user experience is improved. In addition, in the present disclosure, the photographing position of the unmanned aerial vehicle is determined according to the relative position between two points, i.e., the target on the ground and the user. Compared with the solution in the prior art that the photographing position of the unmanned aerial vehicle is controlled based on the position of the user alone, the present disclosure can find a better photographing position and ensure the quality of the image photographed by the unmanned aerial vehicle.

First Embodiment

Figure 1:
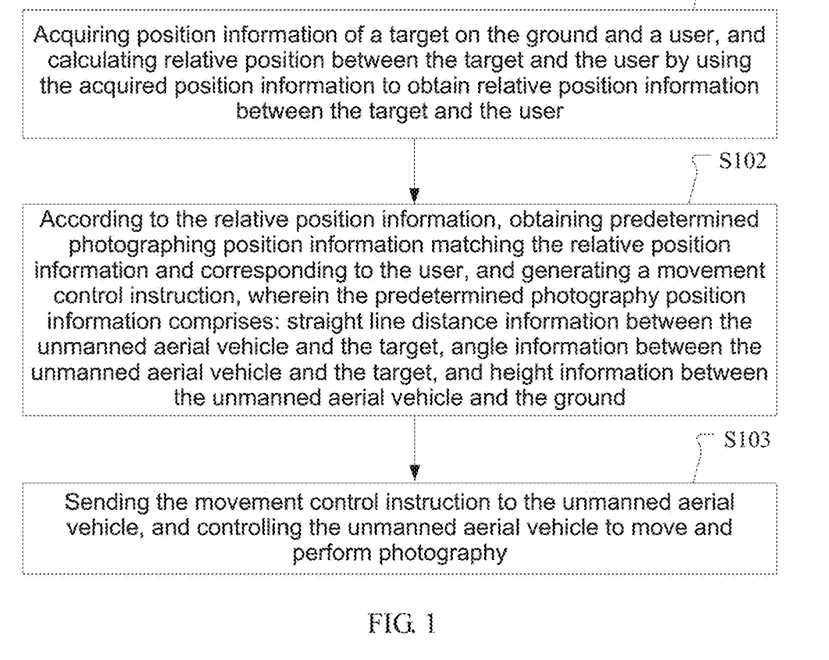
FIG. 1 is a schematic flow chart of a method for controlling photography of an unmanned aerial vehicle according to an embodiment of the present disclosure.

FIG. 1 is a schematic flow chart of a method for controlling photography of an unmanned aerial vehicle according to an embodiment of the present disclosure. Referring to FIG. 1, the method for controlling photography of an unmanned aerial vehicle according to the present embodiment comprises the following steps:

Step S101: acquiring position information of a target on the ground and a user, and calculating relative position between the target and the user by using the acquired position information to obtain relative position information between the target and the user;

Step S102: according to the relative position information, obtaining predetermined photographing position information matching the relative position information and corresponding to the user, and generating a movement control instruction, wherein the predetermined photographing position information comprises: straight line distance information between the unmanned aerial vehicle and the target, angle information between the unmanned aerial vehicle and the target, and height information between the unmanned aerial vehicle and the ground; and Step S103: sending the movement control instruction to the unmanned aerial vehicle, and controlling the unmanned aerial vehicle to move and perform photography.

It can be seen from the method shown in FIG. 1 that, in the present embodiment, the relative position between the target and the user is calculated by acquiring the position information of the target on the ground and the user individually, by using the relative position as a reference, the photographing position information of the unmanned aerial vehicle corresponding to the relative position information is obtained, and the unmanned aerial vehicle is controlled to move and perform photography operation according to the photographing position information. Therefore, when the user moves, the unmanned aerial vehicle can be automatically controlled to adjust the photographing position and perform photography, so the number of times of adjusting the position of the unmanned aerial vehicle by the user can be avoided or reduced, the user need not control the unmanned aerial vehicle frequently any more, the interaction between the user and the unmanned aerial vehicle and the camera on the unmanned aerial vehicle can be reduced, and the user experience is improved.

In addition, the photographing position of the unmanned aerial vehicle is determined according to the relative position between the target on the ground and the user. Compared with that the photographing position of the unmanned aerial vehicle is determined based on the position of the user alone, since the relative direction information is introduced, the determination of photographing position of the unmanned aerial vehicle is more accurate, thereby ensuring that the unmanned aerial vehicle can photograph a better image.

Second Embodiment

Figure 2:
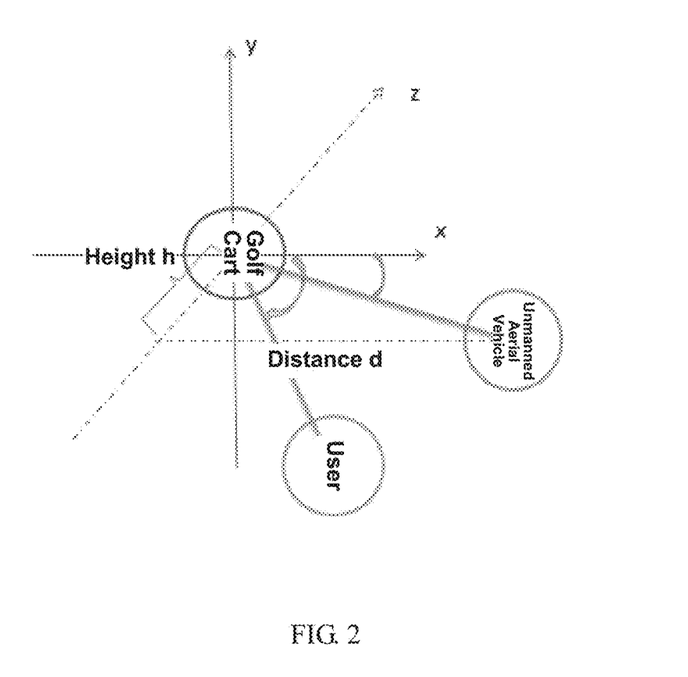
FIG. 2 is a principle diagram of determining a photographing position of an unmanned aerial vehicle according to an embodiment of the present disclosure.

FIG. 2 is a principle diagram of determining a photographing position of an unmanned aerial vehicle according to an embodiment of the present disclosure. Referring to FIG. 2, in the present embodiment, the photographing position of the unmanned aerial vehicle comprises two parts, which will be described below respectively.

The first part is to determine the relative position between the target and the user.

The relative position between the target and the user distance_direct (distance, direction) is measured. The relative position here includes distance information and direction information.

In actual use, the step of acquiring position information of a target on the ground and a user comprises: receiving position information of the target sent by a GPS unit provided on the target on the ground, and receiving position information of the user sent by a GPS unit in a wearable device carried by the user. In other words, the locating of the target on the ground can be realized by a GPS (Global Positioning System) unit provided on the target on the ground, and the locating of the user can be realized by a GPS unit in a smart mobile terminal such as a smart phone carried by the user or a wearable device worn on the user body.

After obtaining the positions of the target and the user, the relative position between the target and the user is obtained by calculation using differential GPS according to the position information of the target and the position information of the user; that is, the relative position between the target and the user can be obtained by using differential GPS, and then the relative position distance_direct (distance, direction) is calculated, for example, distance_direct (1.2 m, 50°), i.e., the straight line distance between the user and the target is 1.2 meters, and the angle between the two is 50 degrees.

Differential GPS is a highly accurate working way of GSP, i.e., using two GSPs to determine the position of a target. The purpose of making difference is to eliminate common errors and improve locating accuracy. For example, a GPS receiver is placed on the base station for observation. According to the known precise coordinates of the base station, the distance between the base station and the satellite is calculated. There is a difference between the pseudo distances observed by the base station receiver due to the existence of errors. The difference (correction value) is sent out by the base station in real time. The user receiver receives the correction value from the base station while performing GPS observation, and corrects the locating result to eliminate common errors. This technique can improve the locating accuracy. Generally, the cloud server has a powerful computing power, so in the present embodiment, the calculation of the relative position between the target and the user is completed by the cloud server.

FIG. 2 shows the relative position between the target and the user distance_direct (distance, direction) and the photographing position parameters of the unmanned aerial vehicle.

In FIG. 2, the target on the ground is a golf cart, and a plane rectangular coordinate system is established by taking the position of the golf cart as the origin.

The second part is to determine the photographing position of the unmanned aerial vehicle.

In this part, the photographing position information of the unmanned aerial vehicle is determined according to the distance d and direction (i.e., angle) between the target and the user. The photographing position information of the unmanned aerial vehicle includes: the straight line distance between the unmanned aerial vehicle and the golf cart, the angle between the unmanned aerial vehicle and the golf cart, and the height h between the unmanned aerial vehicle and the ground.

After calculating the relative position relation between the user and the target, the predetermined photographing position information matching the relative position information and corresponding to the user is obtained according to the relative position information. For example, the user is identified, and if the user is identified as a registered valid user, user photographing data corresponding to the valid user are called, and predetermined photographing position information matching the relative position information is acquired from the user photographing data; otherwise, empirical photographing data are called, and predetermined photographing position information matching the relative position information is acquired from the empirical photographing data.

In other words, the cloud server may identify the current user first, and if the user is identified as a registered valid user, user photographing data corresponding to the valid user are called, and predetermined photographing position information matching the relative position information is acquired from the user photographing data; otherwise, empirical photographing data are called, and predetermined photographing position information matching the relative position information is acquired from the empirical photographing data. The user photographing data include at least: at least one piece of relative position information of a specified valid user (i.e., the current valid user) and a target, and one or more pieces of predetermined photographing position information of the unmanned aerial vehicle corresponding to each piece of relative position information. The empirical photographing data include at least: at least one piece of relative position information between the user and the target, and one or more pieces of predetermined photographing position information of the unmanned aerial vehicle corresponding to each piece of relative position information.

In an embodiment, the user photographing data may further include parameter adjustment information of a photography device (such as a camera) on the unmanned aerial vehicle, to control the unmanned aerial vehicle to photograph according to predetermined photography parameters (such as focal length, aperture, and shutter) at a predetermined position, and improve user satisfaction with the photography of the unmanned aerial vehicle. It should be noted that the parameter adjustment information also matches the calculated relative position information between the target on the ground and the current user. Similarly, the empirical photographing data may further include parameter adjustment information of the photography device.

Here, the user photographing data are acquired by collecting photographing data of a specified valid user. The collection method may be one or the combination of the following two methods:

(1) When the user controls the unmanned aerial vehicle to photograph, the information related to the photography operation such as the photographing position information of the unmanned aerial vehicle and photography parameter information that is inputted when the user controls the unmanned aerial vehicle to photograph is automatically and silently collected, and the photographing data of the user are obtained.

(2) After the user has logged in, the user may be prompted to input the photographing data such as the photographing position information of the unmanned aerial vehicle and the photography parameter information that are satisfactory to the user himself.

In actual use, when the user has logged in for the first time, a set of initial photographing positions of the unmanned aerial vehicle Camera_location ( ) may be preset for the user. If in the subsequent process of controlling the unmanned aerial vehicle to photograph, the initial photographing positions of the unmanned aerial vehicle Camera_location ( ) are not modified by the user, the initial photographing positions of the unmanned aerial vehicle Camera_location ( ) will be used continuously, and the unmanned aerial vehicle may be controlled to photograph according to the initial photographing positions of the unmanned aerial vehicle.

The empirical photographing data may be preset, for example, directly preset or preset according to test data. However, in order to improve the user's photography experience, they may also be calculated according to the user photographing data of a plurality of valid users. That is, the empirical photographing data may be obtained by comprehensively calculating based on the photography habits of a large number of users.

For example, the calculation method may be one or a combination of the following three specific calculation methods:

(1) counting in real time use frequency of a photographing position corresponding to the relative position information in user photographing data of each valid user, performing selection from the photographing positions whose use frequency is greater than or equal to a preset use frequency threshold, to obtain the empirical photographing data which include at least one piece of predetermined photographing position information corresponding to each piece of relative position information and use frequency information of each piece of photographing position information.

This calculation method selects the user photographing data whose use frequency is relatively large as the empirical photographing data. Because usually the use frequency can represent the user's preference, and the user photographing data whose use frequency is relatively large often correspond to the user's satisfactory images. Therefore, by selecting the user photographing data whose use frequency is relatively large as the empirical photographing data, the user's degree of satisfaction with the recommended empirical photographing data can be ensured, and the user experience is improved.

(2) counting basic information of each valid user, performing cluster analysis on the basic information, performing selection from the user photographing data of the plurality of valid users, to obtain empirical photographing data having the same basic information and including at least one piece of predetermined photographing position information corresponding to each piece of relative position information.

The basic information of the user comprises: gender information, age information, height information and weight information, etc. Users usually have some personalized information. Taking the height information as an example, the user with a height of 160 cm and the user with a height of 180 cm usually have different photography angles. This calculation method counts the basic information of each valid user, and when it is detected that the current user is not logged in or unregistered and is controlling the unmanned aerial vehicle to photograph, according to the obtained basic information of the current user (for example, a height of 160 cm), recommends at least one predetermined photographing position which is the same as the basic information (that is, recommends from the user photographing data of valid users with a height of 160 cm) and corresponding to the relative position information to the current user, thereby improving the user's degree of satisfaction with the recommended empirical photographing data.

(3) counting photographing weather information, performing cluster analysis on the photographing weather information, performing selection from the user photographing data of the plurality of valid users, to obtain empirical photographing data having the same photographing weather information and including at least one piece of predetermined photographing position information corresponding to each piece of relative position information.

The weather has a great influence on the photography of unmanned aerial vehicles. For example, the lights and the air qualities are different when it is sunny and when rainy, so the qualities of the images photographed by the unmanned aerial vehicle will be different. This calculation method takes consideration of the weather factor, and predetermined photographing position information under one type of weather is taken as the empirical photographing data.

For example, at least one piece of predetermined photographing position information corresponding to each piece of relative position information in a rainy day is taken as one type of empirical photographing data, and at least one piece of predetermined photographing position information corresponding to each piece of relative position information in a sunny day is taken as another type of empirical photographing data, so that based on the current weather information, the search can be made in predetermined photographing position information whose photographing weather information is the same and the relative position information is the same, so as to determine the empirical photographing data.

It can be seen that through the above methods (2) and (3), different empirical photographing data are pushed with respect to personalized information of users of different ages, genders, etc. Thus, personalized settings are more suitable for different attributes of users, the locating is more accurate, and the user adhesiveness is improved.

It should be noted that the above three calculation methods of the empirical photographing data may also be used in combination to ensure that more suitable empirical photographing data are recommended to the user.

In specific uses, one may first search to determine whether there are user photographing data corresponding to the user in the cloud server, and if yes, directly call the user photographing data Camera_location (distance, angle, height, unmanned aerial vehicle tilt) to control the unmanned aerial vehicle to move to a specified position and perform the photography operation; and if there are no corresponding user photographing data, recommend the empirical photographing data calculated by the cloud server according to the personalized information (for example, age, gender, weather, etc.) of the user, and the cloud server also records whether the current user accepts the recommended empirical photographing data, to facilitate the subsequent optimization of the empirical photographing data according to feedbacks from a plurality of users.

In the present embodiment, the cloud server will save the user photographing data. In other words, for a certain user, each relative position between the target and the user distance_direct ( ) corresponds to a preset photographing position information of the unmanned aerial vehicle (the camera on it) Camera_location ( ), and the user photographing data corresponding to each of the user are saved in the cloud server.

In the photography process of the unmanned aerial vehicle, if the user modifies the photographing position information Camera_location ( ) corresponding to a certain relative position information of the user distance_direct ( ), the cloud server records the modified Camera_location ( ), saves the modified data and overwrites the data corresponding to the specified user. For the empirical value in the cloud server, the Camera_location ( ) corresponding to the empirical value in the cloud server distance_direct ( ) is updated in real time by using the newly saved data of the user as well as the original data according to a specific algorithm (optimum selection algorithm).

Certainly, for a certain user, each relative position between the target and the user distance_direct ( ) may correspond to more than one piece of preset photographing position information of the unmanned aerial vehicle Camera_location ( ). At this time, when it is necessary to acquire the photographing position information matching a certain relative position between the target and the user, selection is made automatically based on their use frequency by the user.

It should be noted that, the difference between the user photographing data and the empirical photographing data is that the user photographing data are set by a certain user himself and correspond to the user's photographing data, while the empirical photographing data are big data and are obtained by calculation by the cloud server based on the massive user data saved therein.

Third Embodiment

In the present embodiment, the method for controlling photography of an unmanned aerial vehicle is described by taking a specific application scenario in which a user controls an unmanned aerial vehicle to photograph when playing golf on a golf course as an example.

Figure 3:
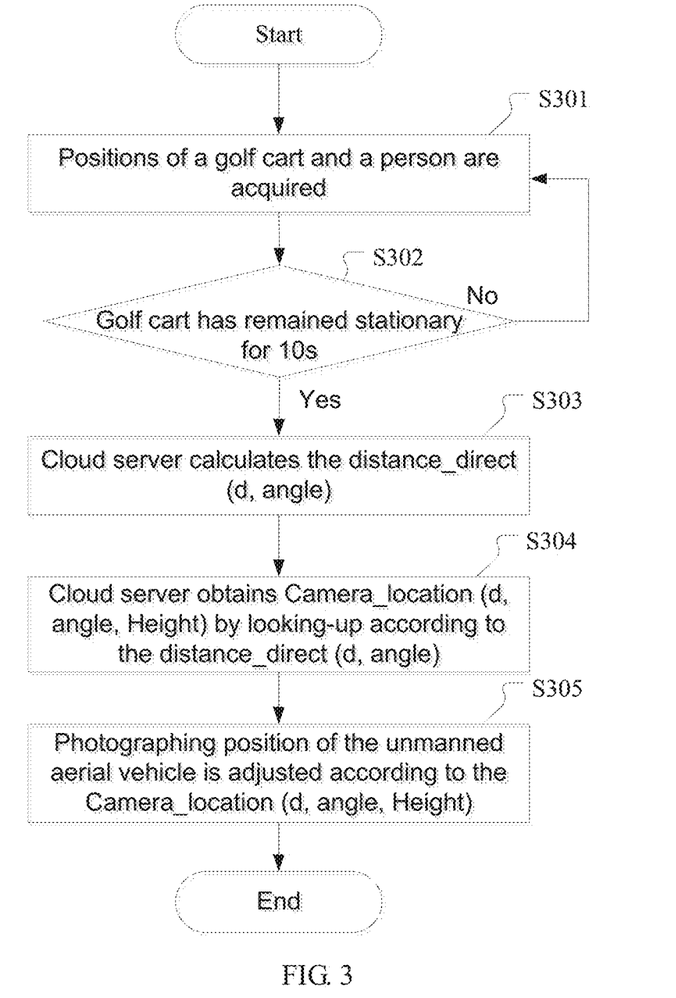
FIG. 3 is a schematic flow chart of a method for controlling photography of an unmanned aerial vehicle according to an embodiment of the present disclosure.

FIG. 3 is a schematic flow chart of a method for controlling photography of an unmanned aerial vehicle according to an embodiment of the present disclosure. Referring to FIG. 3, after the process begins, the following steps are performed:

Step S301, the positions of a golf cart and a person are acquired.

In this step, a time interval may be set for the position acquisition; for example, it is detected every second whether the positions of the golf cart and the person change. In this way, the positions need not be acquired in real time, so the system power consumption can be reduced; and on the other hand, the moving of the user or the golf cart can be noticed in time in the time interval of one second, and then the subsequent adjustment of the photographing position of the unmanned aerial vehicle is performed according to the changed position.

By the way, the reason why the position relation between the golf cart and the person is selected as the reference to determine the photographing position of the unmanned aerial vehicle, rather than alone using the position relation between the person and the unmanned aerial vehicle is that the movement of the person is too frequent, and if the position relation between the person and the unmanned aerial vehicle is used as the reference to control the movement of the unmanned aerial vehicle, due to the frequent moving of the person, it is difficult to judge when the person is moving normally and when the person is ready to play golf and should be taken a picture. However, if the position relation between the golf cart and the person is used as a reference, even if the person is moving frequently, as long as the person is within a certain range around the golf cart, the golf cart will remain stationary, so it is easier to find the time to photograph and further control the unmanned aerial vehicle to photograph.

In addition, the general direction of the human face may be determined by the relative position between the person and the golf cart. When playing golf, people generally stand with their back to the golf cart, so it is more accurate and more advantageous (more convenient to determine the photographing position with a common reference) to determine the position of the third point by the positions of the two points than to determine the position of the second point by the position of one point.

Step S302, it is judged whether the golf cart has remained stationary for 10s (10 seconds); if yes, step S303 is executed; otherwise step S301 is executed.

In the present embodiment, in order to prevent misoperations, before the step of according to the relative position information, obtaining predetermined photographing position information matching the relative position information and corresponding to the user, the method may further comprise:

according to the relative position information, judging whether to activate the photography of the unmanned aerial vehicle, and when a distance between the target and the user is less than or equal to a preset distance threshold and a duration of time for which the target stays at a current position reaches a preset time threshold, determining to activate the photography of the unmanned aerial vehicle, and determining predetermined photographing position information matching the relative position information and corresponding to the user; here the relative position information includes distance information and direction information.

Specifically, the position relation between the golf cart and the person is selected as a reference to determine the photography time of the unmanned aerial vehicle. When the person is within a certain range around the golf cart and the golf cart is stationary, it may be deemed that the person will play golf near this position, and it may be judged that the unmanned aerial vehicle can be controlled to take a picture, i.e., it is determined when to photograph. When the golf cart is moving, it means that the person is also moving, and at this time the photography of the unmanned aerial vehicle may not be activated to reduce power consumption.

It should be noted that, in other embodiments of the present disclosure, it may be judged by other ways whether to activate the unmanned aerial vehicle to perform photography, for example, by judging the speed of the golf cart and comparing the speed value of the golf cart with a preset threshold, or by collecting the user's actions and determining the photography time when it is caught that the user is performing a certain action (such as raising a hand), which is not limited here. In addition, the 10s (10 seconds) here may also be modified according to the specific use, which is not limited here.

Step S303, the cloud server calculates the distance_direct (d, angle);

After it is determined in step S302 that the unmanned aerial vehicle can be controlled to activate photography, the cloud server may calculate the relative position between the golf cart and the person distance_direct (d, angle) in this step according to the positions of the golf cart and the person acquired in step S301, where d indicates position information, i.e., how far the user is from the golf cart, and angle indicates angle information (angle indicating direction), i.e., in which direction of the golf cart the user is.

In this step, the relative position distance_direct(d, angle) may be calculated every 2 seconds.

Step S304, the cloud server obtains Camera_location (d, angle, Height) by looking-up according to the distance_direct (d, angle);

It should be noted that, the step S304, i.e., that the cloud server obtains Camera_location (d, angle, Height) by looking-up according to the distance_direct (d, angle), is only applicable to one situation, which is that the user is a valid user who has already registered. In this situation, the cloud server saves the user photographing data corresponding to the valid user, and the cloud server can search and obtain the photographing position of the unmanned aerial vehicle Camera_location (d, angle, Height) in the database according to the calculated relative position between the current user and the golf cart. In the photographing position of the unmanned aerial vehicle Camera_location (d, angle, Height), the value of d indicates the straight line distance between the unmanned aerial vehicle and the golf cart, the value of angle indicates the angle between the unmanned aerial vehicle and the golf cart, and the value of Height indicates the height of the unmanned aerial vehicle from the ground.

In actual use, there is another situation, i.e., during the photography process of the unmanned aerial vehicle, if the current user is not logged in or not registered, and there are no data after photography corresponding to the current user, the empirical photographing data may be called and the unmanned aerial vehicle is controlled to adjust the position according to the empirical photographing data. At the same time, the personalized information inputted by the current user may be received, and a message is pushed according to the statistical information and the personalized information.

If the user is a valid user who has logged in and registered, the user will have his own set of Camera_location ( ) in the cloud server. At the beginning, the value of Camera_location ( ) is not modified by the user and the empirical value can be used. Along with the uses by the user, each distance_direct (d, angle) in the user photographing data may be modified by the user. Considering that modification by the user of the photographing position information reflects the user's preference, feedback from the user on the predetermined photographing position information during the photography process of the unmanned aerial vehicle will be received. According to the feedback result, when, the user this time confirms to use the photographing position for photography, increasing the use frequency corresponding to the photographing position in the user data by one and saving; and when the user this time confirms not to use the photographing position for photography and modifies the photographing position information, acquiring the photographing position information that has been modified and saved it.

In other words, according to the feedback result, when the user confirms this time that the photographing position Camera_location ( ) is used for photography, the use frequency corresponding to the photographing position Camera_location ( ) in the user data is increased by one and saved; and when the user confirms not this time that the photographing position Camera_location ( ) is used for photography and the information of the photographing position Camera_location ( ) is modified, the photographing position information that has been modified Camera_position ( ) is acquired and saved, thereby updating the photographing position of the unmanned aerial vehicle.

With respect to the situation that the current user is not a registered valid user, the present embodiment also provides a solution of recommending the empirical photographing data.

Specifically, the empirical photographing data are obtained by calculating according to user photographing data of a plurality of valid users, for example, by counting in real time use frequency of a photographing position corresponding to the relative position information in user photographing data of each valid user, performing selection from the photographing positions whose use frequency is greater than or equal to a preset use frequency threshold, to obtain the empirical photographing data which include at least one piece of predetermined photographing position information corresponding to each piece of relative position information and use frequency information of each piece of photographing position information; or, by counting basic information of each valid user, performing cluster analysis on the basic information, performing selection from the user photographing data of the plurality of valid users, to obtain empirical photographing data having the same basic information and including at least one piece of predetermined photographing position information corresponding to each piece of relative position information. For example, according to the current user's age, for example, 20 years old, one or more photographing positions of the unmanned aerial vehicle corresponding to the relative position between the current user and the golf cart may be searched in the user photographing data of 20-year-old users in the database saved in the cloud server, and then the unmanned aerial vehicle is controlled to adjust position based on the photography position of the unmanned aerial vehicle that was found.

Alternatively, the empirical photographing data are calculated by counting photographing weather information, performing cluster analysis on the photographing weather information, performing selection from the user photographing data of the plurality of valid users, to obtain empirical photographing data having the same photographing weather information and including at least one piece of predetermined photographing position information corresponding to each piece of relative position information. In other words, the empirical value may be calculated according to photographing data of a plurality of users, to obtain the optimal solution. When there are no user data, it may be preset directly or preset according to the test data.

In the present embodiment, at the beginning, each relative position distance_direct ( ) corresponds to a photographing position of the unmanned aerial vehicle Camera_location ( ), and the value may be a preset value. In the process of using, as the use frequency by the user increases, each relative position distance_direct ( ) may correspond to a plurality of photographing positions of the unmanned aerial vehicle Camera_location ( ). In order to facilitate the subsequent recommendation to unregistered users, the optimal solution corresponding to a specified relative position distance_direct ( ), i.e., the optimal photographing position of the unmanned aerial vehicle Camera_location ( ) is obtained from the plurality of photographing positions of the unmanned aerial vehicle Camera_location ( ) according to the optimal selection algorithm. The optimal solution Camera_location ( ) may be directly selected according to the use frequency by the user from the plurality of photographing positions of the unmanned aerial vehicle Camera_location ( ) arranged in order, or obtained by calculation according to the optimal selection algorithm.

The empirical photographing data (i.e., empirical values calculated by the cloud server) may also include the following information: the user's age, gender, weather, etc., and information about the correspondence between different positions and photography angles corresponding to the user's age, gender, weather. The empirical values may also be updated in real time.

Thus, the present embodiment sets different empirical values for different ages and genders of the user, and sets different empirical values for different weathers (the weather information is preset by the cloud server according to the actual weather conditions). Such personalized settings are more suitable for different attributes of users, and the locating is more accurate. Moreover, clustering (data optimization algorithm) is performed according to personalized information (for example, age, gender, etc.) and the photographing data used by the user, to continuously in real time optimize the empirical photographing data information. Here, the personalized information of the user may be voluntarily inputted by the user for obtaining a better service, and then the cloud server allocates a corresponding user account for the user to record the information of the user.

In the present embodiment, the data optimization algorithm may be used in updating the empirical photographing data. For example, the numerical value of the average of the peaks in the middle of the normal distribution of a plurality of user photographing data is taken as the recommended empirical photographing data.

Step S305, the photographing position of the unmanned aerial vehicle is adjusted according to the Camera_location (d, angle, Height).

When the photographing position of the unmanned aerial vehicle is determined, the photography parameters of the unmanned aerial vehicle may be determined according to the distance d and the direction between the golf cart and the person as well as the user data. The photography parameters of the unmanned aerial vehicle include the camera tilt angle (the pitch angle of the unmanned aerial vehicle camera and the horizontal plane) and the focal length. In addition, if in the process of using, the user adjusts the distance, angle and other information of the unmanned aerial vehicle, the corresponding user information and the corresponding position data information may also be automatically uploaded to the cloud server.

The flow process ends by now.

In the method for controlling photography of an unmanned aerial vehicle according to the present embodiment, the photography information of the unmanned aerial vehicle such as the initial position and angle is automatically adjusted according to the preset value and the empirical value updated in real time, thereby reducing the steps of controlling the unmanned aerial vehicle by the user.

In addition, based on the function of learning and memorizing the photographing position and angle, every time the user adjusts the photography angle, the unmanned aerial vehicle is controlled to memorize the photography angle corresponding to the user according to the relative position between the user and the golf cart, and when the user and the golf cart arrive at this relative position again, the unmanned aerial vehicle is controlled to photograph at the angle adjusted by the user.

The unmanned aerial vehicle will memorize the data of each user. At the same time, each unmanned aerial vehicle is connected to the cloud server. For example, when there are no photographing data of the unmanned aerial vehicle corresponding to the relative position between the user and the golf cart in the cloud server user database, the unmanned aerial vehicle is controlled to photograph by using the empirical data in the cloud server. In this way, the user's habits can be memorized according to the relative position relation between the golf cart and the user, and the user's favorite photography angles can be found. Moreover, by using the cloud server storage function, when the user data are not saved, the big data may be used to recommend personalized empirical photography angle, and then the unmanned aerial vehicle is controlled to reach a specified direction and photograph, thereby improving the user experience.

Fourth Embodiment

Figure 4:
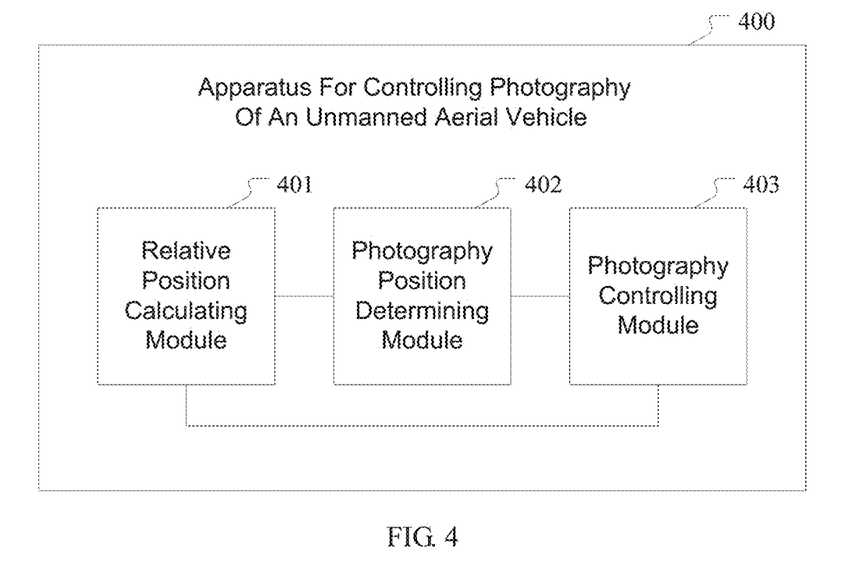
FIG. 4 is a structural block diagram of an apparatus for controlling photography of an unmanned aerial vehicle according to an embodiment of the present disclosure.

FIG. 4 is a structural block diagram of an apparatus for controlling photography of an unmanned aerial vehicle according to an embodiment of the present disclosure. Referring to FIG. 4, the apparatus 400 for controlling photography of an unmanned aerial vehicle comprises:

a relative position calculating module 401 for acquiring position information of a target on the ground and a user, and calculating relative position between the target and the user by using the acquired position information to obtain relative position information between the target and the user;

a photographing position determining module 402 for according to the relative position information, obtaining predetermined photographing position information matching the relative position information and corresponding to the user, and generating a movement control instruction, wherein the predetermined photographing position information comprises: straight line distance information between the unmanned aerial vehicle and the target, angle information between the unmanned aerial vehicle and the target, and height information between the unmanned aerial vehicle and the ground; and a photography controlling module 403 for sending the movement control instruction to the unmanned aerial vehicle, and controlling the unmanned aerial vehicle to move and perform photography.

In an embodiment of the present disclosure, the photography position determining module 402 is for identifying the user, and if the user is identified as a registered valid user, calling user photographing data corresponding to the valid user and acquiring predetermined photographing position information matching the relative position information from the user photographing data; otherwise, calling empirical photographing data and acquiring predetermined photographing position information matching the relative position information from the empirical photographing data;

wherein the user photographing data include at least: at least one piece of relative position information of a specified valid user and the target, and one or more pieces of photographing position information of the unmanned aerial vehicle corresponding to each piece of relative position information; and the empirical photographing data include at least: at least one piece of relative position information between the user and the target, and one or more pieces of predetermined photographing position information of the unmanned aerial vehicle corresponding to each piece of relative position information.

In an embodiment of the present disclosure, the apparatus 400 for controlling photography of an unmanned aerial vehicle further comprises: a photography judging module, for according to the relative position information, judging whether to activate the photography of the unmanned aerial vehicle, and when a distance between the target and the user is less than or equal to a preset distance threshold and a duration of time for which the target stays at a current position reaches a preset time threshold, determining to activate the photography of the unmanned aerial vehicle, and determining predetermined photographing position information matching the relative position information and corresponding to the user;

wherein the relative position information includes distance information and direction information.

In an embodiment of the present disclosure, the apparatus 400 for controlling photography of an unmanned aerial vehicle further comprises: a photography database module, for collecting photographing data of a specified valid user to obtain the user photographing data corresponding to the valid user, and calculating according to user photographing data of a plurality of valid users to obtain the empirical photographing data; and the step of calculating according to user photographing data of a plurality of valid users to obtain the empirical photographing data comprises:

counting in real time use frequency of a photographing position corresponding to the relative position information in user photographing data of each valid user, performing selection from the photographing positions whose use frequency is greater than or equal to a preset use frequency threshold, to obtain the empirical photographing data which include at least one piece of predetermined photographing position information corresponding to each piece of relative position information and use frequency information of each piece of photographing position information;

or, counting basic information of each valid user, performing cluster analysis on the basic information, performing selection from the user photographing data of the plurality of valid users, to obtain empirical photographing data having the same basic information and including at least one piece of predetermined photographing position information corresponding to each piece of relative position information;

or, counting photographing weather information, performing cluster analysis on the photographing weather information, performing selection from the user photographing data of the plurality of valid users, to obtain empirical photographing data having the same photographing weather information and including at least one piece of predetermined photographing position information corresponding to each piece of relative position information.

In an embodiment of the present disclosure, the apparatus 400 for controlling photography of an unmanned aerial vehicle further comprises: a photographing position updating module, for receiving feedback from the user on the predetermined photographing position information during the photography process of the unmanned aerial vehicle, and according to the feedback result, when the user this time confirms to use the photographing position for photography, increasing the use frequency corresponding to the photographing position in the user data by one and saving, and when the user this time confirms not to use the photographing position for photography and modifies the photographing position information, acquiring the photographing position information that has been modified and saving it.

The relative position calculating module 401 is for receiving position information of the target sent by a GPS unit provided on the target on the ground, and receiving position information of the user sent by a GPS unit in a wearable device carried by the user; and according to the position information of the target and the position information of the user, obtaining the relative position between the target and the user by calculation using differential GPS.

It should be noted that the apparatus for controlling photography of an unmanned aerial vehicle of the present embodiment corresponds to the above method for controlling photography of an unmanned aerial vehicle, so the details of the working process of the apparatus for controlling photography of an unmanned aerial vehicle of the present embodiment may refer to the description of the implementation steps of the method for controlling photography of an unmanned aerial vehicle in the above embodiments, which will not be repeated here.

Fifth Embodiment

Figure 5:
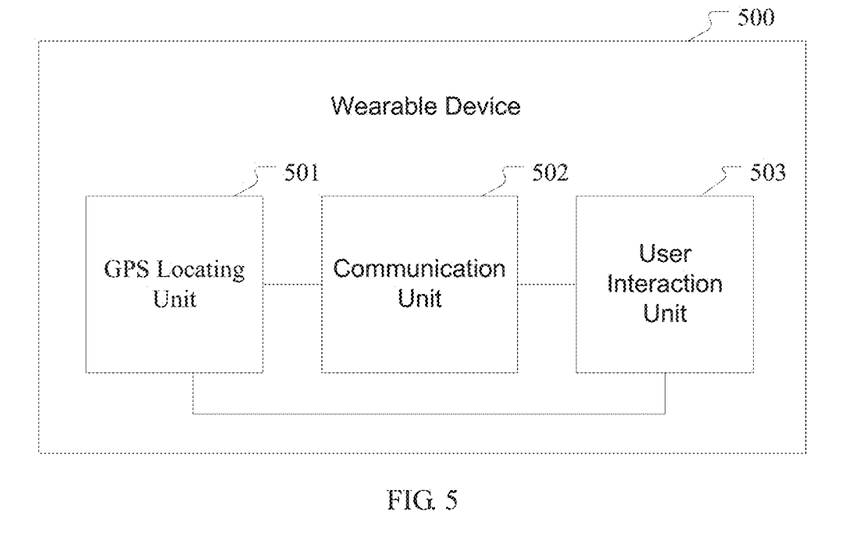
FIG. 5 is a structural block diagram of a wearable device according to an embodiment of the present disclosure.

A wearable device is provided in the present embodiment. FIG. 5 is a structural block diagram of a wearable device according to an embodiment of the present disclosure. Referring to FIG. 5, the wearable device 500 comprises:

a GPS locating unit 501 for sending position information of the wearable device to a cloud server in real time;

a communication unit 502 for receiving predetermined photographing position information sent by the cloud server, and sending the predetermined photographing position information to a user interaction unit 503, wherein the predetermined photographing position information is obtained by using the method for controlling photography of an unmanned aerial vehicle in the above embodiments; and the user interaction unit 503 for outputting the predetermined photographing position information to the user, receiving confirmation information that is inputted by the user for confirming photography by using the predetermined photographing position, or receiving position modification information that is inputted by the user for modifying the predetermined photographing position, sending the confirmation information or the position modification information to the communication unit 502 and in turn sending to the cloud server by the communication unit 502.

Here the wearable device is, for example, a smart watch, smart glasses or a smart bracelet.

In sum, in the method and apparatus for controlling photography of an unmanned aerial vehicle of the present disclosure, the relative position between the target and the user is calculated by acquiring the position information of the target on the ground and the user respectively, and by using the relative position as a reference, the photographing position of the unmanned aerial vehicle corresponding to the relative position can be obtained automatically, and the unmanned aerial vehicle is controlled to move to a predetermined photographing position and perform photography.

Since the unmanned aerial vehicle can be automatically controlled to adjust position and perform photography, the quantity and frequency of operations on the unmanned aerial vehicle by the user are reduced, the interaction between the user and the unmanned aerial vehicle to adjust the photographing position and photography parameters of the unmanned aerial vehicle can even be avoided, so the user experience is improved.

Moreover, the photographing position of the unmanned aerial vehicle is determined according to the relative position between the target and the user, rather than based on the position relation between the user and the unmanned aerial vehicle singly. Since there is a common reference (the target on the ground), it is more accurate and more advantageous to determine the position of the third point (the unmanned aerial vehicle) by the positions of the two points (the user and the target) than to determine the position of the second point (the unmanned aerial vehicle) by the position of one point (the user), and it is ensured that the unmanned aerial vehicle can photograph a better image.

In addition, the present disclosure also provides a wearable device. The confirmation or modification of the photographing position of the unmanned aerial vehicle can be completed by using the wearable device, which facilitates the user's control over the photography of the unmanned aerial vehicle and improves the competitiveness of the wearable device.

The above is only the preferred embodiments of the present disclosure and is not intended to limit the protection scope of the present disclosure. Any modification, equivalent substitution, improvement, etc. made within the spirit and principle of the present disclosure should all be included in the protection scope of the present disclosure.

What is claimed is:

1. A method for controlling photography of an unmanned aerial vehicle, comprising:

acquiring position information of a target on the ground and a user, and calculating relative position between the target and the user by using the acquired position information to obtain relative position information between the target and the user;

according to the relative position information, obtaining predetermined photographing position information matching the relative position information and corresponding to the user, and generating a movement control instruction, wherein the predetermined photographing position information comprises: straight line distance information between the unmanned aerial vehicle and the target, angle information between the unmanned aerial vehicle and the target, and height information between the unmanned aerial vehicle and the ground; and sending the movement control instruction to the unmanned aerial vehicle, and controlling the unmanned aerial vehicle to move and perform photography.

2. The method according to claim 1, wherein the step of according to the relative position information, obtaining predetermined photographing position information matching the relative position information and corresponding to the user comprises:

identifying the user, and if the user is identified as a registered valid user, calling user photographing data corresponding to the valid user and acquiring predetermined photographing position information matching the relative position information from the user photographing data; otherwise, calling empirical photographing data and acquiring predetermined photographing position information matching the relative position information from the empirical photographing data;

wherein the user photographing data include at least: at least one piece of relative position information of a specified valid user and the target, and one or more pieces of predetermined photographing position information of the unmanned aerial vehicle corresponding to each piece of relative position information; and the empirical photographing data include at least: at least one piece of relative position information between the user and the target, and one or more pieces of predetermined photographing position information of the unmanned aerial vehicle corresponding to each piece of relative position information.

3. The method according to claim 1, wherein prior to the step of according to the relative position information, obtaining predetermined photographing position information matching the relative position information and corresponding to the user, the method further comprises:

according to the relative position information, judging whether to activate the photography of the unmanned aerial vehicle, and when a distance between the target and the user is less than or equal to a preset distance threshold and a duration of time for which the target stays at a current position reaches a preset time threshold, determining to activate the photography of the unmanned aerial vehicle, and determining predetermined photographing position information matching the relative position information and corresponding to the user;

wherein the relative position information includes distance information and direction information.

4. The method according to claim 2, wherein the user photographing data are acquired by collecting photographing data of a specified valid user; and the empirical photographing data are obtained by calculating according to user photographing data of a plurality of valid users, wherein the calculating comprises:

counting in real time use frequency of a photographing position corresponding to the relative position information in user photographing data of each valid user, performing selection from the photographing positions whose use frequency is greater than or equal to a preset use frequency threshold, to obtain the empirical photographing data which include at least one piece of predetermined photographing position information corresponding to each piece of relative position information and use frequency information of each piece of photographing position information;

or, counting basic information of each valid user, performing cluster analysis on the basic information, performing selection from the user photographing data of the plurality of valid users, to obtain empirical photographing data having the same basic information and including at least one piece of predetermined photographing position information corresponding to each piece of relative position information;

or, counting photographing weather information, performing cluster analysis on the photographing weather information, performing selection from the user photographing data of the plurality of valid users, to obtain empirical photographing data having the same photographing weather information and including at least one piece of predetermined photographing position information corresponding to each piece of relative position information.

5. The method according to claim 1, further comprising:

receiving feedback from the user on the predetermined photographing position information during the photography process of the unmanned aerial vehicle, and according to the feedback result, when the user this time confirms to use the photographing position for photography, increasing use frequency corresponding to the photographing position in the user data by one and saving, and when the user this time confirms not to use the photographing position for photography and modifies the photographing position information, acquiring the modified photographing position information and saving it.

6. The method according to claim 1, wherein the step of acquiring position information of a target on the ground and a user comprises:

receiving position information of the target sent by a GPS unit provided on the target on the ground, and receiving position information of the user sent by a GPS unit in a wearable device carried by the user; and obtaining the relative position between the target and the user by calculation using differential GPS according to the position information of the target and the position information of the user.

7. An apparatus for controlling photography of an unmanned aerial vehicle, comprising:

a relative position calculating module, for acquiring position information of a target on the ground and a user, and calculating relative position between the target and the user by using the acquired position information to obtain relative position information between the target and the user;

a photographing position determining module, for according to the relative position information, obtaining predetermined photographing position information matching the relative position information and corresponding to the user, and generating a movement control instruction, wherein the predetermined photographing position information comprises:
straight line distance information between the unmanned aerial vehicle and the target, angle information between the unmanned aerial vehicle and the target, and height information between the unmanned aerial vehicle and the ground; and
a photography controlling module, for sending the movement control instruction to the unmanned aerial vehicle, and controlling the unmanned aerial vehicle to move and perform photography.

8. The apparatus according to claim 7, wherein the photographing position determining module is for identifying the user, and
if the user is identified as a registered valid user, calling user photographing data corresponding to the valid user and acquiring predetermined photographing position information matching the relative position information from the user photographing data;
otherwise, calling empirical photographing data and acquiring predetermined photographing position information matching the relative position information from the empirical photographing data;
wherein the user photographing data include at least: at least one piece of relative position information of a specified valid user and the target, and one or more pieces of photographing position information of the unmanned aerial vehicle corresponding to each piece of relative position information; and
the empirical photographing data include at least: at least one piece of relative position information between the user and the target, and one or more pieces of predetermined photographing position information of the unmanned aerial vehicle corresponding to each piece of relative position information.

9. The apparatus according to claim 7, further comprising:
a photography judging module, for according to the relative position information, judging whether to activate the photography of the unmanned aerial vehicle, and when a distance between the target and the user is less than or equal to a preset distance threshold and a duration of time for which the target stays at a current position reaches a preset time threshold, determining to activate the photography of the unmanned aerial vehicle, and determining predetermined photographing position information matching the relative position information and corresponding to the user;
wherein the relative position information includes distance information and direction information.

10. The apparatus according to claim 8, further comprising:
a photography database module, for collecting photographing data of a specified valid user to obtain the user photographing data corresponding to the valid user, and calculating according to user photographing data of a plurality of valid users to obtain the empirical photographing data;
wherein the step of calculating according to user photographing data of a plurality of valid users to obtain the empirical photographing data comprises:
counting in real time use frequency of a photographing position corresponding to the relative position information in user photographing data of each valid user, performing selection from the photographing positions whose use frequency is greater than or equal to a preset use frequency threshold, to obtain the empirical photographing data which include at least one piece of predetermined photographing position information corresponding to each piece of relative position information and use frequency information of each piece of photographing position information.

11. The apparatus according to claim 10, wherein the step of calculating according to user photographing data of a plurality of valid users to obtain the empirical photographing data comprises:
counting basic information of each valid user, performing cluster analysis on the basic information, performing selection from the user photographing data of the plurality of valid users, to obtain empirical photographing data having the same basic information and including at least one piece of predetermined photographing position information corresponding to each piece of relative position information.

12. The apparatus according to claim 10, wherein the step of calculating according to user photographing data of a plurality of valid users to obtain the empirical photographing data comprises:
counting photographing weather information, performing cluster analysis on the photographing weather information, performing selection from the user photographing data of the plurality of valid users, to obtain empirical photographing data having the same photographing weather information and including at least one piece of predetermined photographing position information corresponding to each piece of relative position information.

13. The apparatus according to claim 7, further comprising:
a photographing position updating module, for receiving feedback from the user on the predetermined photographing position information during the photography process of the unmanned aerial vehicle, and
according to the feedback result, when the user this time confirms to use the photographing position for photography, increasing the use frequency corresponding to the photographing position in the user data by one and saving, and when the user this time confirms not to use the photographing position for photography and modifies the photographing position information, acquiring the photographing position information that has been modified and saving it.

14. The apparatus according to claim 7, wherein the relative position calculating module is for receiving position information of the target sent by a GPS unit provided on the target on the ground, and receiving position information of the user sent by a GPS unit in a wearable device carried by the user; and
obtaining the relative position between the target and the user by calculation using differential GPS according to the position information of the target and the position information of the user.

15. A wearable device, comprising:
a GPS locating unit, for sending position information of the wearable device to a cloud server server in real time; and
a communication unit, for receiving predetermined photographing position information sent by the cloud server, and sending the predetermined photographing position information to a user interaction unit; and
the user interaction unit, for outputting the predetermined photographing position information to the user, receiving confirmation information that is inputted by the user for confirming photography by using the predetermined photographing position, or receiving position modification information that is inputted by the user for modifying the predetermined photographing position, sending the confirmation information or the position modification information to the communication unit and in turn sending to the cloud server by the communication unit;

wherein the predetermined photographing position information is obtained by using a method as following:

acquiring position information of a target on the ground and a user, and calculating relative position between the target and the user by using the acquired position information to obtain relative position information between the target and the user;

according to the relative position information, obtaining predetermined photographing position information matching the relative position information and corresponding to the user, wherein the predetermined photographing position information comprises: straight line distance information between the unmanned aerial vehicle and the target, angle information between the unmanned aerial vehicle and the target, and height information between the unmanned aerial vehicle and the ground.

16. The wearable device according to claim 15, wherein the step of according to the relative position information, obtaining predetermined photographing position information matching the relative position information and corresponding to the user comprises:

identifying the user, and if the user is identified as a registered valid user, calling user photographing data corresponding to the valid user and acquiring predetermined photographing position information matching the relative position information from the user photographing data; otherwise, calling empirical photographing data and acquiring predetermined photographing position information matching the relative position information from the empirical photographing data;

wherein the user photographing data include at least: at least one piece of relative position information of a specified valid user and the target, and one or more pieces of predetermined photographing position information of the unmanned aerial vehicle corresponding to each piece of relative position information; and the empirical photographing data include at least: at least one piece of relative position information between the user and the target, and one or more pieces of predetermined photographing position information of the unmanned aerial vehicle corresponding to each piece of relative position information.

17. The wearable device according to claim 15, wherein prior to the step of according to the relative position information, obtaining predetermined photographing position information matching the relative position information and corresponding to the user, the method further comprises:

according to the relative position information, judging whether to activate the photography of the unmanned aerial vehicle, and when a distance between the target and the user is less than or equal to a preset distance threshold and a duration of time for which the target stays at a current position reaches a preset time threshold, determining to activate the photography of the unmanned aerial vehicle, and determining predetermined photographing position information matching the relative position information and corresponding to the user;

wherein the relative position information includes distance information and direction information.

18. The wearable device according to claim 16, wherein the user photographing data are acquired by collecting photographing data of a specified valid user; and the empirical photographing data are obtained by calculating according to user photographing data of a plurality of valid users, wherein the calculating comprises:

counting in real time use frequency of a photographing position corresponding to the relative position information in user photographing data of each valid user, performing selection from the photographing positions whose use frequency is greater than or equal to a preset use frequency threshold, to obtain the empirical photographing data which include at least one piece of predetermined photographing position information corresponding to each piece of relative position information and use frequency information of each piece of photographing position information;

or, counting basic information of each valid user, performing cluster analysis on the basic information, performing selection from the user photographing data of the plurality of valid users, to obtain empirical photographing data having the same basic information and including at least one piece of predetermined photographing position information corresponding to each piece of relative position information;

or, counting photographing weather information, performing cluster analysis on the photographing weather information, performing selection from the user photographing data of the plurality of valid users, to obtain empirical photographing data having the same photographing weather information and including at least one piece of predetermined photographing position information corresponding to each piece of relative position information.

19. The wearable device according to claim 15, further comprising:

receiving feedback from the user on the predetermined photographing position information during the photography process of the unmanned aerial vehicle, and according to the feedback result, when the user this time confirms to use the photographing position for photography, increasing use frequency corresponding to the photographing position in the user data by one and saving, and when the user this time confirms not to use the photographing position for photography and modifies the photographing position information, acquiring the modified photographing position information and saving it.

20. The wearable device according to claim 15, wherein the step of acquiring position information of a target on the ground and a user comprises:

receiving position information of the target sent by a GPS unit provided on the target on the ground, and receiving position information of the user sent by a GPS unit in a wearable device carried by the user; and obtaining the relative position between the target and the user by calculation using differential GPS according to the position information of the target and the position information of the user.

* * * * *